(12) United States Patent
Jitaru

(10) Patent No.: US 7,450,402 B2
(45) Date of Patent: Nov. 11, 2008

(54) SOFT SWITCHING HIGH EFFICIENCY FLYBACK CONVERTER

(75) Inventor: Ionel D. Jitaru, Tucson, AZ (US)

(73) Assignee: DET International Holding Limited, George Town, Grand Cayman (KY)

( * ) Notice: Subject to any disclaimer, the term of this patent is extended or adjusted under 35 U.S.C. 154(b) by 0 days.

(21) Appl. No.: 10/511,117

(22) PCT Filed: Apr. 11, 2003

(86) PCT No.: PCT/CH03/00244
§ 371 (c)(1),
(2), (4) Date: Jul. 8, 2005

(87) PCT Pub. No.: WO03/088460

PCT Pub. Date: Oct. 23, 2003

(65) Prior Publication Data
US 2005/0270001 A1 Dec. 8, 2005

Related U.S. Application Data

(60) Provisional application No. 60/372,132, filed on Apr. 12, 2002.

(51) Int. Cl.
*H02M 3/335* (2006.01)
(52) U.S. Cl. .................. 363/20; 363/17; 363/21.14
(58) Field of Classification Search ........... 363/16–20, 363/21.4, 21.7, 21.12, 79, 80, 97, 48, 53, 363/89, 21.14, 21.17, 70; 323/208, 271
See application file for complete search history.

(56) References Cited

U.S. PATENT DOCUMENTS

| | | | |
|---|---|---|---|
| 4,866,587 A * | 9/1989 | Wadlington | 363/16 |
| 4,958,268 A * | 9/1990 | Nagagata et al. | 363/16 |
| 5,109,326 A * | 4/1992 | Martin, Jr. | 363/21.14 |
| 5,321,597 A | 6/1994 | Alacoque | |
| 5,539,630 A * | 7/1996 | Pietkiewicz et al. | 363/17 |
| 5,594,629 A | 1/1997 | Steigerwald | |
| 5,636,108 A * | 6/1997 | Taurand | 363/20 |
| 5,719,755 A | 2/1998 | Usui | |

(Continued)

FOREIGN PATENT DOCUMENTS

AT     399 432     9/1994

(Continued)

*Primary Examiner*—Rajnikant B Patel
(74) *Attorney, Agent, or Firm*—Gallagher & Kennedy, P.A.; Thomas D. MacBlain

(57) ABSTRACT

DC-DC converters such as flyback converters achieve self-regulation by communication information between primary and secondary circuits through the power transformer. Operating in accordance with a generalized concept or algorithm, the converter can be bi-directional and self-regulating. Control of the turn OFF times of semiconductor switches in first and second circuits coupled to first and second windings of the power transformer determines whether power flow is in one direction through the converter or the other direction. Turn ON timing of each semiconductor switch is when there is a reverse current through the switch and voltage across the switch is at or near zero. Turn OFF of a switch can be controlled from one or more operating parameters of the converter such as output voltage, in which case the converter's self-regulation is affected through duty cycle variation with variations in output voltage.

43 Claims, 7 Drawing Sheets

U.S. PATENT DOCUMENTS

| | | | | |
|---|---|---|---|---|
| 5,745,351 A | * | 4/1998 | Taurand | 363/20 |
| 5,768,118 A | | 6/1998 | Faulk et al. | |
| 5,841,641 A | * | 11/1998 | Faulk | 363/21.14 |
| 6,069,804 A | * | 5/2000 | Ingman et al. | 363/21.14 |
| 6,084,784 A | | 7/2000 | Durbaum | |
| 6,151,233 A | * | 11/2000 | Kondo | 363/125 |
| 6,198,638 B1 | | 3/2001 | Lee | |

FOREIGN PATENT DOCUMENTS

| | | |
|---|---|---|
| EP | 0 336 725 | 10/1989 |
| JP | 0521 3653 | 8/1993 |
| WO | WO 03/003552 | 1/2003 |

\* cited by examiner

SOFT SWITCHING HIGH EFFICIENCY FLYBACK CONVERTER

CROSS REFERENCE TO RELATED APPLICATIONS

Priority is claimed from U.S. provisional patent application Ser. No. 60/372,132 entitled "Soft Switching High Efficiency Flyback Converter" filed Apr. 12, 2002 in the name of Ionel D. Jitaru. That application is incorporated herein by reference.

FIELD OF THE INVENTION

This invention relates to DC-DC converters and more particularly to a driving/synchronization technique used to achieve zero voltage switching and regulate the output of DC-DC converters.

BACKGROUND OF THE INVENTION

In order to miniaturize power supplies, the control for power supplies should be simplified. Switching frequencies have been increased to reduce capacitive and magnetic elements in miniaturized power supplies. Still, in today's and future power supplies there is a need to reduce the number of components needed to control the power supply. Among the greatest challenges is communication across the isolation boundary. Several techniques exist. These include opto-couplers, transformers, radio frequency devices, etc. This invention provides a method and circuit that use the same transformer that is used for power conversion, i.e. the power transformer. The technique of this invention is not to send complicated encoded information, but to actually change the supply's effective duty cycle from the secondary.

A preferred embodiment of this invention is a self-oscillating flyback converter. The method and circuitry of the invention can be used with other topologies as well. The flyback converter is believed the best topology to illustrate the invention and the most easily understood. Plus, this topology offers a reduced number of control parts, which illustrates the advantage of this invention and makes it a preferred embodiment.

FIG. 2A shows a typical self-oscillating flyback converter in which an input voltage source 16 supplies a primary winding 18 of a transformer 32 in series with a primary switch 8. Its turn OFF command is controlled by a combination of a transistor 22 and positive feedback from a winding 20, a capacitor 14 and a gate resistor 12. Turn ON is primarily controlled with the same winding circuit, plus a resistor 10 provides turn ON at initial startup. The transistor 22 is turned ON if the current through a resistor 24 is sufficiently high when the switch 8 is ON. During the times the switch 8 is OFF, it provides a voltage 25 alternating in polarity to the output circuit. When the output load circuit comprising a load 31 and a filtering capacitor 30 is coupled, during the OFF time of the switching period, current flows through secondary winding 26 of the transformer 32 and through a diode D1 to the output load 31 and the filter capacitor 30.

FIG. 2B displays certain voltage and current versus time waveforms for the self-oscillating flyback circuit parameters, i.e.: primary gate voltage 34 of the switch 8, primary drain voltage 36 of the switch 8, and the currents-transformer primary winding current 40 and the secondary winding current 38.

A first, main drawback of this approach is that there is no regulation. The control is simple, but adding regulation would ordinarily add complexity and parts. Plus, in the past, to regulate the output well, an opto-coupler was added. A second drawback is that for low output voltages the diode has a relatively large forward voltage drop. A third drawback is the primary switch 8 does not have zero voltage switching in all situations. By adding a synchronous rectifier in place of the diode D1, to serve as a switch in the secondary circuit, the second drawback can be avoided. However, this could introduce other problems including cross-conduction between the primary switch 8 and the synchronous rectifier which needs to be avoided.

There remains, therefore, a need for an approach to using primary and secondary switches in a converter such that self regulation is accomplished, the switch in the output secondary circuit exhibits a low forward voltage drop, zero voltage switching is accomplished and cross-conduction is avoided.

SUMMARY OF THE INVENTION

In accordance with this invention, a method and circuit are employed in which energy is pushed back to the input or primary circuit from the secondary in a power conversion circuit to vary the circuit's duty cycle and in this way regulate the circuit's output voltage. In a sense, the secondary changes the effective duty cycle by making the OFF time longer. This regulates the output. In the primary circuit, the extra energy that is pushed back is put to good use by providing zero voltage switching. This also prevents cross-conduction between the primary switch and the secondary's synchronous rectifier. Since zero volt switching can prevent switching losses at higher frequencies, higher frequencies can be employed to further reduce the size of the converter.

Controlling the timing of the secondary and primary MOSFETs serving as the synchronous rectifier and the primary switch is an important feature of this invention. The invention provides a simple method of achieving this and a general methodology.

It is an object of the present invention to provide a general concept of a flyback converter that is bi-directional. In other words, each of the two circuits coupled by the power transformer may be either the input, primary circuit or the output, secondary circuit. In the converter according to the present invention, by controlling MOSFET ON and OFF times correctly, zero voltage switching is accomplished for both MOSFETs. The algorithm according to which the converter operates to accomplish this is described below.

Objects of this invention are, among others:

1. A driving technique or concept (called herein the "algorithm") that accomplishes zero voltage switching in both the primary and secondary switching devices of a converter.

2. A regulation technique using the algorithm in the primary, secondary or both.

3. Circuits and methods of operation that implement detection and regulation of the driving technique by using one or more of winding voltage detection, current detection, or ripple detection in the secondary side of a DC-DC converter.

In accordance with one preferred embodiment of the invention, a DC to DC converter is provided that has first and second circuits including first and second semiconductor switches coupled with first and second windings of a power transformer and a control circuit coupled to each of the first and second circuits to control conduction in the semiconductor switches, at least one of the first and second control circuits sensing the direction of current through the associated semiconductor switch and turning ON that switch when a reverse current is detected. Preferably in the preferred exemplary embodiment the control circuit that turns on the semiconductor switch upon the detection of reverse current turns that switch ON at a time when there is no voltage across the associated power transformer winding so as to provide substantially zero voltage switching.

In accordance with one preferred embodiment, both of the first and second control circuits that control the first and second semiconductor switches enable the switches to be turned ON when a reverse current through the switch is detected. In the preferred embodiments according to this invention, the DC-DC converter has at least one of the control circuits adapted to turn OFF the semiconductor switch controlled thereby in response to at least one operating parameter of the converter. Those operating parameters may be one or more of output voltage of the converter, voltage across one of the first and second windings or current in one of the semiconductor switches. In one preferred converter, it is the control circuit coupled to the first circuit in controlling relation to the first semiconductor switch that turns OFF that semiconductor switch as a function of the sensed converter operating parameter. In another preferred embodiment it is the second control circuit that controls the second semiconductor switch that turns OFF that semiconductor switch in response to the operating parameter and in yet a third embodiment both semiconductor switches are turned OFF based on converter operating parameters.

In another preferred embodiment of the invention it is a control winding on the power transformer that is coupled to the control circuit controlling one of the semiconductor switches. Preferably, in accordance with this invention in a number of preferred embodiments thereof, the first and second circuits coupled to the first and second windings can be either primary or secondary windings. Put another way, the DC-DC converter is bi-directional, moving power in either direction depending upon the control of the semiconductor switches.

An embodiment of this invention is a self-regulating DC-DC converter that has a secondary circuit voltage sensing control circuit connected to control the second semiconductor switch in dependence on a voltage related to converter output voltage. The secondary winding of this converter is coupled to conduct in a forward direction through the secondary switch a diminishing current in a forward direction upon termination of current in the power transformer's primary winding. The secondary circuit voltage sensing control circuit is responsive to the voltage sensed to turn the secondary switch OFF when current in the secondary winding is in a range from substantially zero current to a level of reverse current, thereby inducing in the primary winding a current level in the range from about zero current to a reverse current level there. This then causes energy to be transferred back to the primary winding when the secondary circuit voltage sensing control circuit senses an over-voltage.

In one specific preferred embodiment, the secondary circuit voltage sensing control circuit employs a comparator having a reference voltage source connected to one input, the sensed voltage related to converter output voltage connected to another of the inputs and a control electrode of the secondary semiconductor switch coupled in switch controlling relation to an output of the comparator. In the preferred embodiment of this self-regulating DC-DC converter, the voltage that is related to converter output voltage is the voltage across the secondary winding of the converter's power transformer. In the self-regulating DC-DC converter, transfer of energy back to the primary for the purpose of self-regulation is accomplished by decreasing the duty cycle of the converter by altering the switching times of the secondary conductor switch when an over-voltage in the secondary circuit is detected.

Broadly, the preferred DC-DC converter embodiment of this invention can be described as a first control circuit coupled to a first circuit in controlling relation to a first semiconductor switch in current conduction relation to the first winding of a power transformer, a second control circuit coupled to a second circuit in controlling relation to a second semiconductor switch connected in current conducting relation to a second winding of the power transformer and sensing elements connected with each of the first and second control circuits to detect one or more operating parameters of the first and second circuits and enable the semiconductor switches to be turned ON in response thereto. Preferably the sensing element can be a control winding on the power transformer, elements responsive to current direction in the semiconductor switches, elements responsive to the level of current in the semiconductor switches, voltages across the first winding or the second winding, input voltage to the converter and output voltage from the converter and time delay. In all of the above-described preferred embodiments, the semiconductor switches may be MOSFETs. The MOSFET has an intrinsic turn-ON threshold which in one preferred embodiment can be, with the number of turns in the control winding, used to control the turn ON of the second semiconductor switch. In a preferred embodiment, each MOSFET is turned on at zero drain voltage and with reverse current through the switch. The turn OFF times of the first and second semiconductor switches determines the direction of power flow through the converter.

Broadly, the method or technique according to a preferred approach to this invention following the algorithm for operating a DC-DC converter comprises providing the circuitry including a power transformer with first and second semiconductor switches in current conducting relation with first and second windings of the power transformer, applying the input DC voltage to a first circuit coupled to the first of the pair of windings, turning OFF the first semiconductor switch to induce a reverse current in the second winding and through the semiconductor switch in current conducting relation therewith, turning ON the second semiconductor switch connected with the second winding when voltage across the second winding is substantially zero and while current in the second winding and second semiconductor switches is reverse current, turning OFF the second semiconductor switch when current in the second winding and second semiconductor switch is forward current, turning ON the first semiconductor switch connected with the first winding when voltage across the first winding is substantially zero and while current in the first winding and the first semiconductor switch is reverse current. Preferably the method further includes sensing first and second currents in the first and second semiconductor switches and inputting first and second current detection signals to the first and second control circuits controlling the switches.

The above and further objects and advantages of the invention will be better understood from the following detailed description of at least one preferred embodiment of the invention, taken in consideration with the accompanying drawings.

DETAILED DESCRIPTION

Figure 1A:
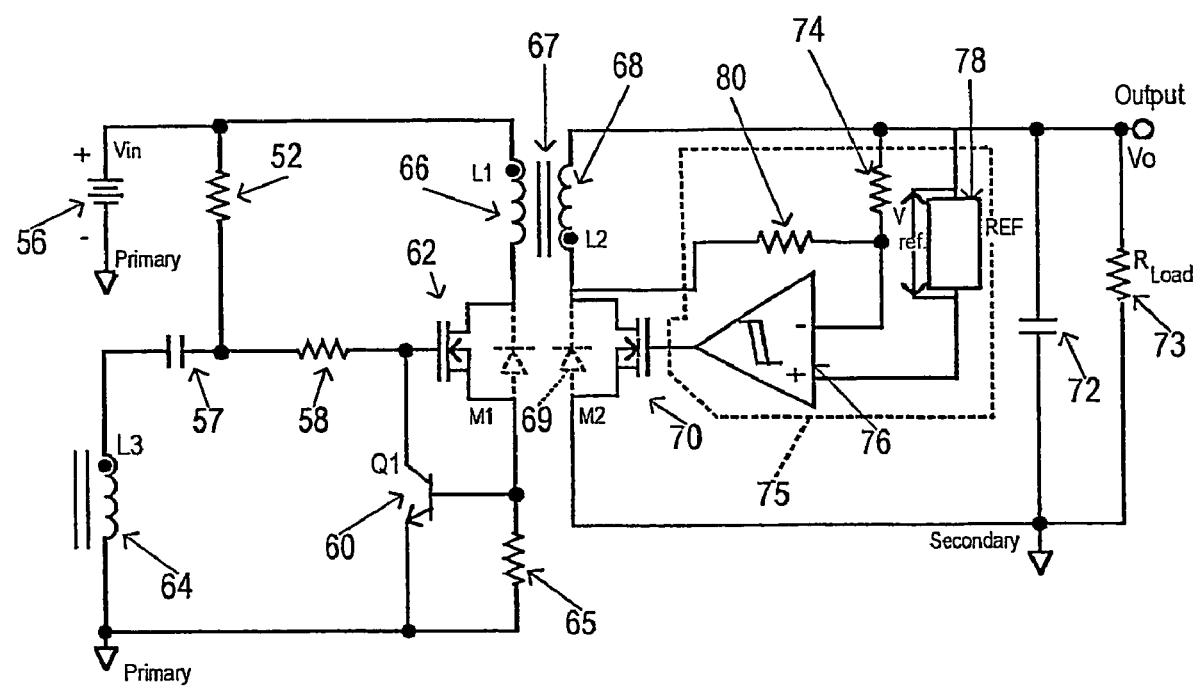
FIG. 1A is a semi-generalized schematic of a self-oscillating flyback converter according to this invention.
Figure 1B:
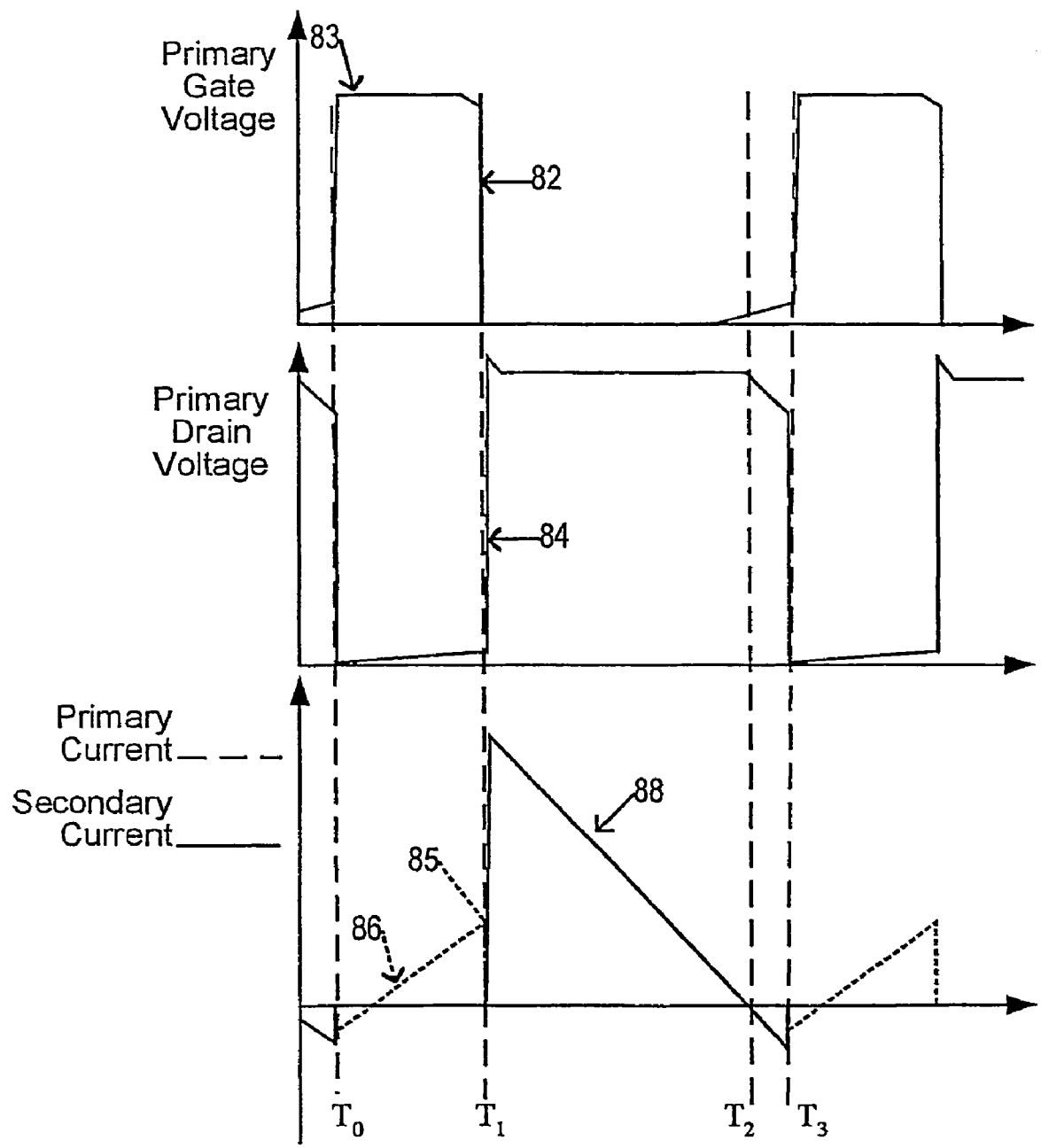
FIG. 1B is a graphical illustration that plots selected waveforms of the converter according to FIG. 1A.
Figure 2A:
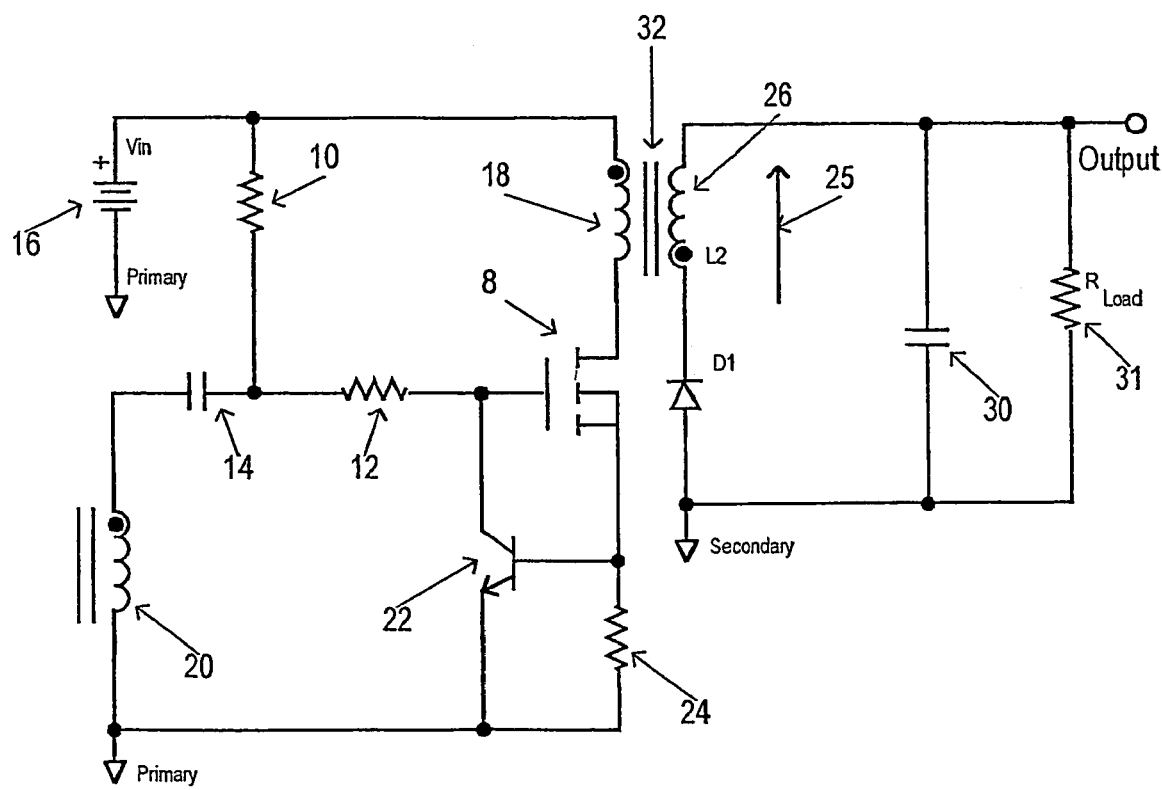
FIG. 2A is a schematic of a prior art self-oscillating flyback converter.
Figure 2B:
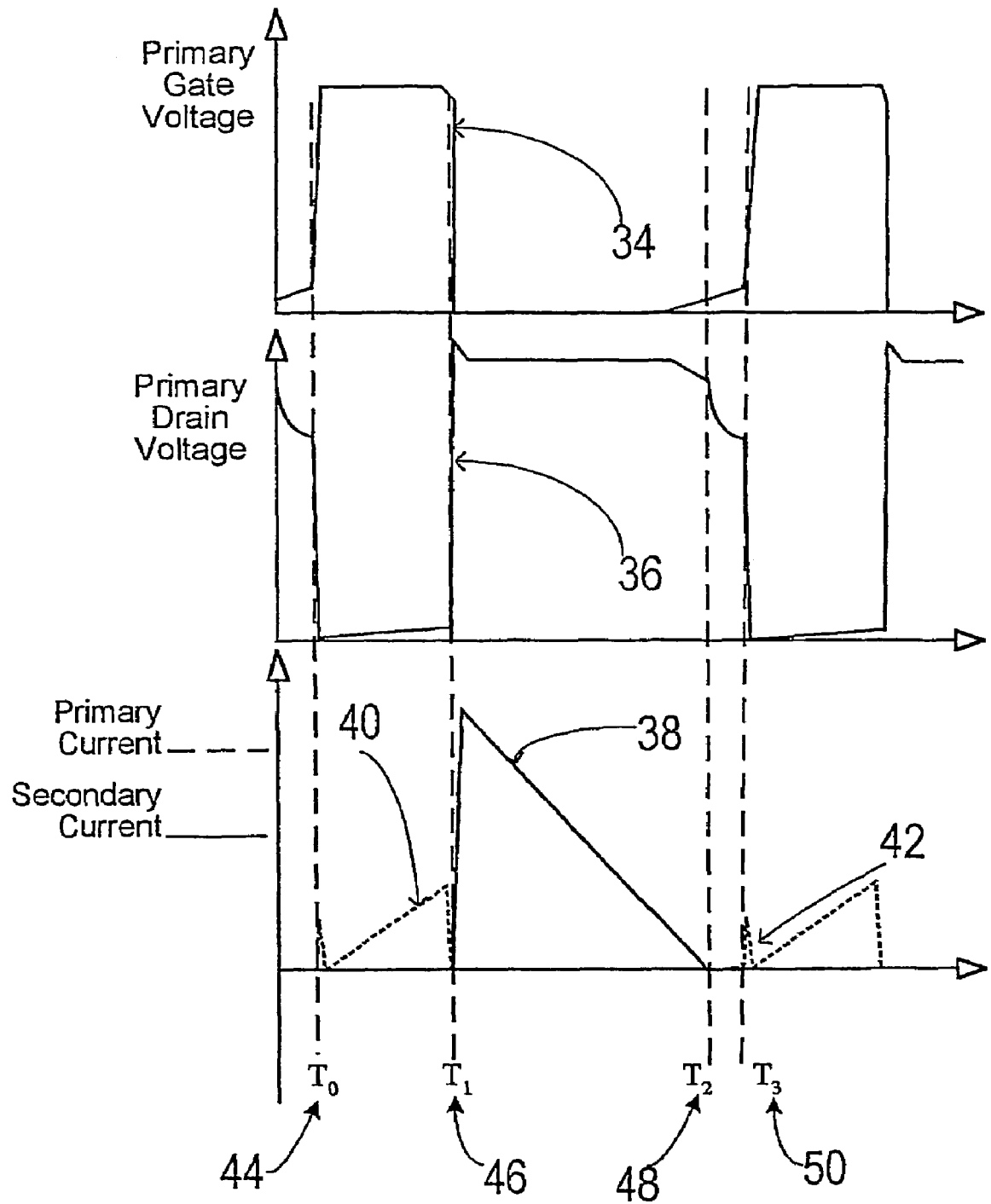
FIG. 2B is a graphical illustration that plots selected waveforms of a typical self-oscillating flyback converter such as that shown in FIG. 2A.

A semi-general illustration of the proposed concept applied to a self-oscillating flyback converter is illustrated in FIG. 1A with corresponding waveforms shown in FIG. 1B. Assume the converter is just powered up by applying an input voltage Vi from a DC voltage source 56. A resistor 52 charges a capacitor 57 and, through resistor 58, a gate capacitance of a MOSFET M1 acting as a primary switch 62. The MOSFET M1 turns ON when its gate threshold is reached. Voltage is applied to the primary winding 66 as the primary drain voltage 84 of M1 starts to go down at point $T_0$ as illustrated in FIG. 1B. This in turn produces a voltage on winding a 64 which increases the primary gate voltage 82 on the MOSFET M1 further. This saturates the device. This is shown at point 83 in FIG. 1B. Primary current 86 ramps up at a rate dependent on the inductance of the primary winding 66. When the primary current 86 reaches a level, at point 85 in FIG. 1B, that produces a drop across a resistor 65 larger than a $V_{be}$ needed to turn ON a transistor 60, this transistor turns ON. This starts the discharge of the primary gate voltage 82 of the MOSFET M1 at a time $T_1$ shown in FIG. 1B. When the MOSFET M1 starts to turn off, the primary drain voltage 84 of the MOSFET M1 starts to rise. This changes the voltage on the positive feedback winding 64 to a lower value, which further shots OFF the MOSFET M1, more quickly producing a fast turn OFF of that switch. Once the MOSFET M1 is completely OFF the current built up in the primary winding 66 and transformer 67 must flow through an available winding, i.e. secondary winding 68. Put another way, collapse of the field built up by the current in the primary winding 66 causes the buildup of current in the secondary winding 68 as is typical in flyback converters. When the voltage on secondary winding 68 exceeds the output voltage $V_O$, the secondary current 88 starts to flow through the body diode 69 of a MOSFET M2.

A control circuit 75 for the MOSFET M2 is made up of a comparitor 76, a reference voltage source 78 connected from the output to one input (+) of the comparitor, and a voltage divider 74, 80 connected to the other comparitor input (−). The reference voltage source 78 provides a fixed voltage $V_{ref}$ across it. It may be a small battery or equivalent The control circuit 75 in the secondary turns ON the MOSFET M2 once it detects a negative voltage at the drain of the MOSFET M2. This reduces the drop across M2. The current decays with constant negative slope in the secondary from time $T_1$ to time $T_2$ as it delivers energy to the output. The current eventually crosses zero at time $T_2$. Then the secondary current 88 reverses, which flows into the drain of the MOSFET M2 producing a positive voltage drop. Where there is a sufficient amount of positive voltage at the drain of the MOSFET M2 detected by the divider formed by the pair of resistors 80 and 74, a control capacitor turns OFF the MOSFET M2 at time $T_3$. So, at time $T_3$, the secondary current 88 is negative or "reverse." The reference voltage source 78 is used to regulate the output voltage which modulates the turn OFF time. If the output voltage is low, the MOSFET M2 is turned OFF right at zero current. If the output is higher, then the MOSFET 72 is left ON longer, which pushes more negative or "reverse" current back to the primary circuit. By changing the amount of current going back, the secondary side of the converter can regulate the output. When the MOSFET M2 turns OFF the current that was pushed back (negative secondary current 88), the transformer reverses the primary winding 66. The primary winding starts to move charge out of the MOSFET M1 drain back into the input source 56. This starts to lower the primary drain voltage 84 at time $T_3$. The resistor 58 provides a delay while this is happening such that the MOSFET M1 turns ON when its drain reaches zero. The greater the current pushed back to the primary from the secondary the faster the drain of the MOSFET M1 will fall. Once M1 is turned on, the whole process repeats. Both MOSFETs M1 and M2 experienced zero voltage turn ON.

Figure 3:
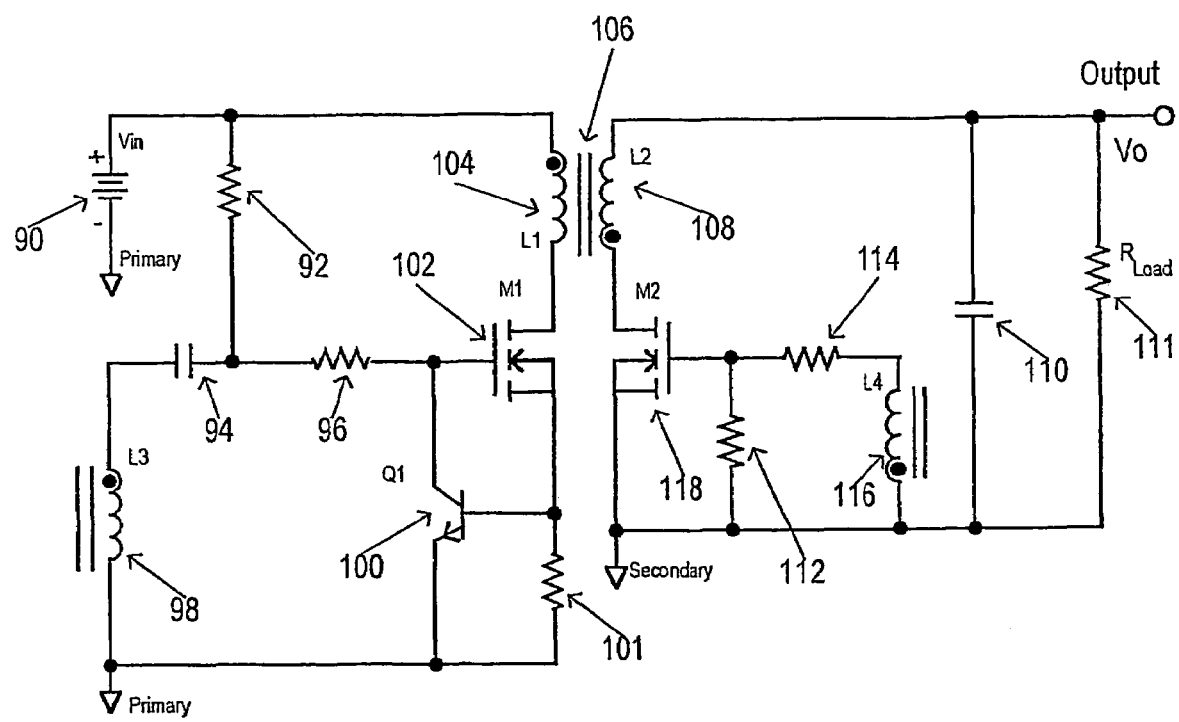
FIG. 3 is a schematic of a further embodiment of a flyback converter according to the invention.

Another simple control is illustrated in FIG. 3. All the primary components are the same, but the control of the MOSFET M2 is accomplished with an extra winding 116. The MOSFET M2 itself regulates the voltage by its intrinsic turn-ON threshold. Resistors 112, 114 and the extra winding 116 turns ratio help to adjust the output voltage. The advantage of this topology is that it is very simple. The disadvantage is that the MOSFET M2 is not turned ON very well. But for low power, small converters the topology of FIG. 3 can be very useful.

Figure 4A:
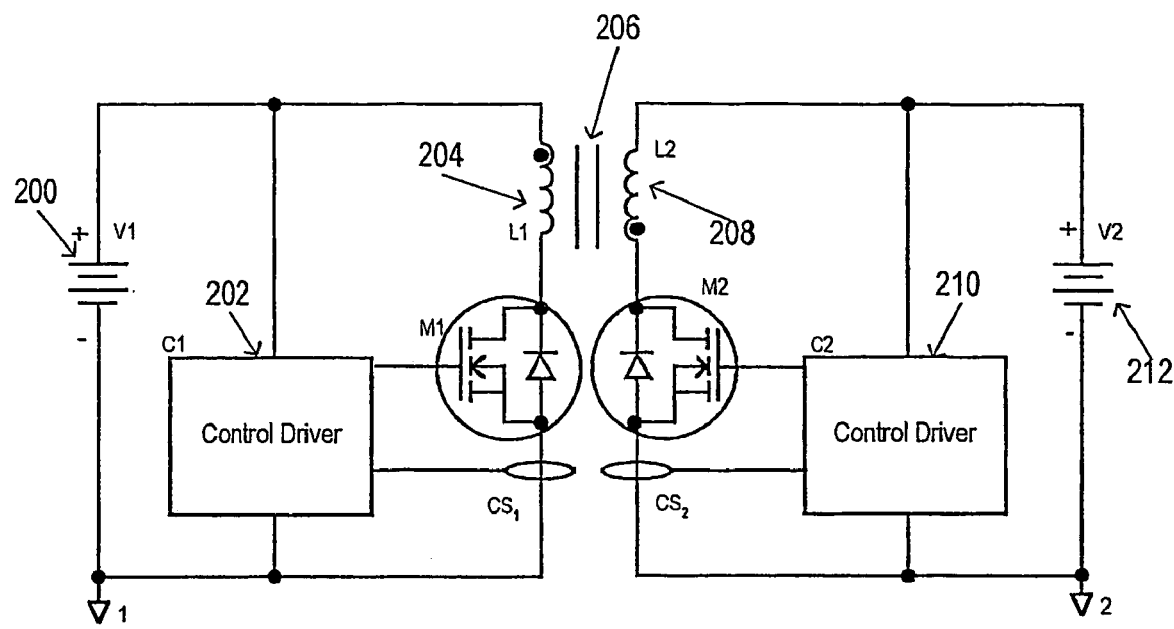
FIG. 4A is a schematic partially in block diagram form of a generalized flyback converter according to the invention.
Figure 4B:
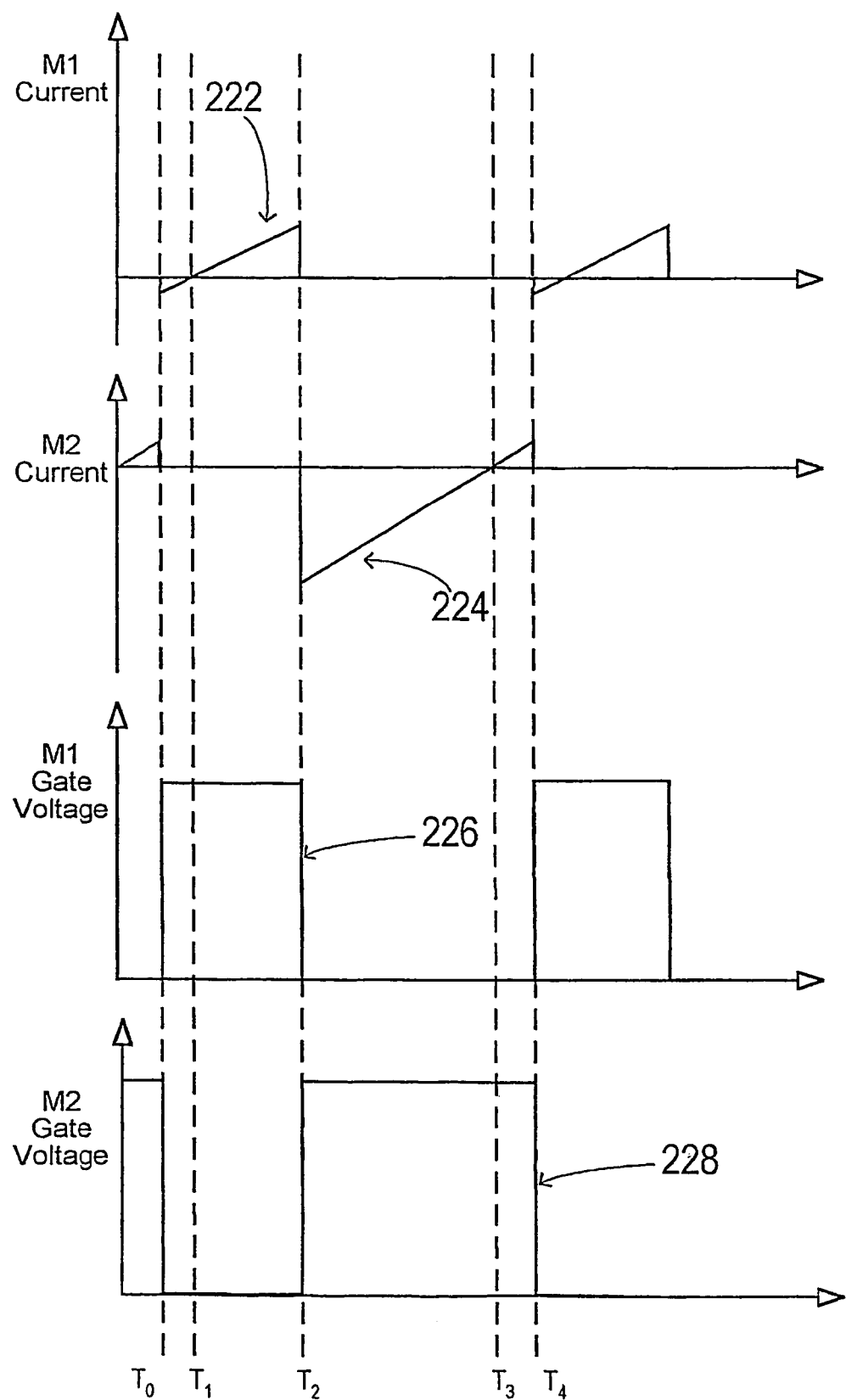
FIG. 4B is a graphical illustration that plots selected waveforms of the generalized flyback converter of FIG. 4A.

To illustrate more generally the concept and timing accomplished by the algorithm of the present invention, a more general schematic is shown in FIG. 4A with waveforms in FIG. 4B. The converter can be bi-directional. Assuming that energy is being processed from left to right, a control circuit 202 turns ON a MOSFET M1 at time $T_0$ (in FIG. 4B). This is a time after it detects a negative or reverse current 222 flowing through the current sensor $CS_1$ plus a delay so that the drain of the MOSFET M1 has reached zero. It then decides, only when the current 222 has become positive, based on the input voltage or a fixed time, and/or winding voltages, to shut OFF M1. The algorithm on which the control circuit 202 operates turns M1 ON at zero voltage on the drain of M1 and when there is a negative or reverse current 222 in the MOSFET switch M1, and as long as the current is negative the MOSFET M1 must remain ON; then when the current is positive the control circuit 202 is allowed to decide how long to leave the MOSFET M1 ON. The decision on how long to remain ON is based on the input voltage, output voltage, winding voltages or peak current 222. The same algorithm applies to a secondary side control circuit 210. The circuit 210 uses current sensor $CS_2$. The current in the MOSFET M2 is monitored. M2 is turned ON when its drain is zero and there is a negative current 224 through it. Again the decision to turn OFF is allowed only when the current 224 is positive. The amount of time the current is positive is again up to the power direction and the regulation method used. The way the regulation of the input or the output is accomplished determines the direction of power flow. As long as the base algorithm is followed both switches have zero voltage switching. In FIG. 4B, it can be seen that current through M1 has the same basic shape as current in M2. The waveforms show power flow from primary to secondary since the average of the current 222 in M1 is positive. The gate voltage of M1 and the gate voltage of M2 are primarily inverted except for delays needed to achieve zero voltage switching. At $T_0$, M1 is turned ON, at $T_1$, the current 222 crosses zero, and after that the control circuit 202 decides when to turn OFF M1. At T2, the control circuit 202 turns OFF M1 with a low gate voltage 226. After a short delay, to wait for zero volts on the drain of M2, M2 is turned ON by the control circuit 210 applying to the gate of M2 the voltage 228 since it detected a negative current through $CS_2$. At time $T_3$, the current 224 crosses zero and again the decision to turn OFF is allowed only when the current 224 is positive. At time $T_4$, the secondary control circuit 210 decides to shut OFF based on one or more of the input voltage 200, output voltage 212, winding voltage 208, or current level in $CS_2$.

The foregoing descriptions of preferred embodiments are exemplary and not intended to limit the claimed invention. Obvious modifications that do not depart from the spirit and scope of the invention as claimed will be apparent to those skilled in the art. For example, although MOSFETs are described as the primary switch and secondary synchronous rectifier or switch, other semiconductor switches may be employed.

What is claimed is:

1. A DC-DC converter including a power transformer having first and second windings inductively coupled and connected with first and second circuits, respectively, a first semiconductor switch in the first circuit connected in current conducting relation to the first winding of the power transformer and a second semiconductor switch in the second circuit connected in current conducting relation to the second winding of the power transformer; the improvement comprising:
   a first control circuit coupled to the first circuit in controlling relation to the first semiconductor switch, a second control circuit coupled to the second circuit in controlling relation to the second semiconductor switch, at least one of the first and second control circuit having a current sensor for detecting the direction of current through the semiconductor switch controlled by that control circuit and enabling the turning ON of that semiconductor switch when a reverse current through the semiconductor switch is detected.

2. The DC-DC converter according to claim 1, wherein both of the first and second control circuits have a current sensor for detecting the direction of current through each semiconductor switch controlled thereby and enabling turning ON of that semiconductor switch.

3. The DC-DC converter according to claim 1, wherein each of the control circuits having a current sensor for detecting the direction of current applies to a control electrode of the semiconductor switch controlled by that control circuit a signal turning ON that switch at a time subsequent to detection of a reverse current through that switch, while current in that switch is still reverse current and when voltage across that switch has reached substantially zero volts.

4. The DC-DC converter according to claim 2, wherein each of the control circuits having a current sensor for detecting the direction of current applies to a control electrode of the semiconductor switch controlled by that control circuit a signal turning ON that switch at a time subsequent to detection of a reverse current through that switch, while current in that switch is still reverse current and when voltage across that switch has reached substantially zero volts.

5. The DC-DC converter according to claim 2, wherein at least one of the control circuits turns OFF the semiconductor switch controlled by that control circuit responsive to at least one of input voltage to the DC-DC converter, output voltage of the DC-DC converter, voltage across one of the first and second windings, and current in one of the semiconductor switches.

6. The DC-DC converter according to claim 5, wherein the at least one control circuit that turns OFF the semiconductor switch is the first control circuit.

7. The DC-DC converter according to claim 5, wherein the at least one control circuit that turns OFF the semiconductor switch is the second control circuit.

8. The DC-DC converter according to claim 5, wherein the at least one control circuit that turns OFF the semiconductor switch comprises both the first and second control circuits.

9. The DC-DC converter according to claim 1, wherein at least one of the first and second control circuits includes a control winding wound on the power transformer.

10. The DC-DC converter according to claim 1, wherein the converter is reversible, either of the first and second circuits with which the first and second windings are connected is adapted to serve as either a primary, input circuit or a secondary, output circuit of the converter.

11. A self-regulating DC-DC converter including a power transformer having a primary and a secondary winding inductively coupled and connected with a primary and secondary circuit, respectively, a primary semiconductor switch in the primary circuit connected in current conducting relation to the primary winding of the power transformer and a secondary semiconductor switch in the secondary circuit connected in current conducting relation to the secondary winding of the power transformer; the improvement comprising:
   (a) first control means for controlling the first semiconductor switch,
   (b) second control means for controlling the second semiconductor switch,
   (c) means for sensing current in one of the first and second semiconductor switches, and
   (d) one of the control means being connected with the means for sensing and adapted to turn ON the semiconductor switch at substantially zero voltage across the switch and reverse current through the switch as sensed by the means for sensing.

12. The DC-DC converter according to claim 11, further comprising:
   (e) further means for sensing current in the other of the first and second semiconductor switches, and
   (f) the other of the control means being connected with the means for sensing current in the other of the first and second semiconductor switches and adapted to turn ON that other semiconductor switch at substantially zero voltage across that switch and reverse current through that switch as sensed by the further means for sensing.

13. A self-regulating DC-DC converter including a power transformer having a primary and a secondary winding inductively coupled and connected with a primary and secondary circuit, respectively, a primary semiconductor switch in the primary circuit connected in current conducting relation to the primary winding of the power transformer and a secondary semiconductor switch in the secondary circuit connected in current conducting relation to the secondary winding of the power transformer; the improvement comprising:
   (a) a secondary circuit voltage sensing control circuit operatively connected with the second semiconductor switch in controlling relation thereto, and connected to sense a voltage in the secondary circuit related to the converter output voltage,
   (b) the secondary winding being coupled to conduct a diminishing current in a forward direction upon the termination of current in the primary winding by the primary switch, and
   (c) the secondary circuit voltage sensing control circuit being responsive to the voltage sensed to turn OFF the secondary switch when current in the secondary winding is in a range from substantially zero current and a reverse current level to induce in the primary winding a current level in a range from zero current to a reverse current level to thereby cause, when the secondary circuit voltage sensing control circuit senses an overvoltage condition, energy to be transferred back to the primary winding circuit from the secondary winding circuit at a level depending on the level of over-voltage.

14. The DC-DC converter of claim 13, wherein the secondary circuit voltage sensing control circuit comprises a comparitor having a reference voltage source connected to one input thereof, the voltage related to the converter output voltage connected to another input thereof and a control electrode of the secondary semiconductor switch coupled in switch controlling relation to an output of the comparitor.

15. The DC-DC converter of claim 13, wherein the secondary circuit voltage sensing control circuit is connected to sense the voltage across the secondary winding as the voltage in the secondary circuit related to the converter output voltage.

16. The DC-DC converter of claim 14, wherein the secondary circuit voltage sensing control circuit is connected to sense the voltage across the secondary winding as the voltage in the secondary circuit related to the converter output circuit.

17. The DC-DC converter of claim 16, wherein the secondary circuit voltage sensing control circuit includes a voltage divider connected across the secondary winding and supplying as the another input to the comparitor the voltage related to the converter output voltage.

18. The DC-DC converter of claim 17, wherein the secondary semiconductor switch is a MOSFET having its gate connected with the output of the comparitor.

19. The DC-DC converter of claim 13, wherein each of the primary and secondary semiconductor switches has substantially zero voltage turn ON, the transfer of energy back to the primary upon detection of an over-voltage in the secondary winding decreasing the duty cycle of the converter by altering the switching times of the secondary semiconductor switch.

20. The DC-DC converter of claim 19, further comprising a primary semiconductor switch control circuit coupled in controlling relation to a control electrode of the primary semiconductor switch to turn ON and turn OFF that switch.

21. A DC-DC converter including a power transformer having first and second windings inductively coupled and connected with first and second circuits, respectively, a first semiconductor switch in the first circuit connected in current conducting relation to the first winding of the power transformer and a second semiconductor switch in the second circuit connected in current conducting relation to the second winding of the power transformer; the improvement comprising:
 a first control circuit coupled to the first circuit in controlling relation to the first semiconductor switch, a second control circuit coupled to the second circuit in controlling relation to the second semiconductor switch, each of the first and second control circuits having a sensing element for detecting one or more operating parameters of the first and second circuits and enabling the turning ON of the semiconductor switch controlled thereby in response to said one or more operating parameters, at least one of the first and second control circuits being responsive to a reverse current through the switch controlled thereby to turn ON that switch at substantially zero voltage across it.

22. The DC-DC converter of claim 21, wherein at least one of the sensing elements is a control winding on the power transformer coupled with one of the first and second first and second windings.

23. The DC-DC converter of claim 21, wherein the sensing elements are responsive to one or more of the operating parameters selected from the group consisting of direction of current in one of the semiconductor switches, level of current in one of the semiconductor switches, voltage across the first winding, voltage across the second winding, input voltage to the converter, output voltage from the converter and a time delay.

24. The DC-DC converter of claim 22, wherein the control winding is in the second circuit and is coupled to the second winding, said second winding being a secondary winding.

25. The DC-DC converter of claim 24, wherein the second semiconductor switch is a MOSFET in the second circuit and coupled in current controlling relation to the secondary winding, the MOSFET having an intrinsic turn-ON threshold, the intrinsic turn-ON threshold and the number of turns in the control winding controlling the turn- ON of the second semiconductor switch and the output voltage of the converter.

26. The DC-DC converter of claim 21, wherein the converter is a reversible converter, each of said first and second circuits responsive to an input to serve as a primary circuit supplying its associated one of the first and second windings on the power transformer and developing an output in the other of said first and second circuits serving as a secondary circuit.

27. The DC-DC converter of claim 26, wherein each of the sensing elements in the first and second circuits is a current sensing element connected to sense current in the first and second semiconductor switches, respectively.

28. The DC-DC converter of claim 27, wherein each of the first and second control circuits is responsive to a reverse current through the respective semiconductor switch sensed by the first and second current sensing elements, respectively, to turn ON the associated one of the first and second semiconductor switches at substantially zero voltage across that switch.

29. The DC-DC converter of claim 28, wherein each semiconductor switch is a MOSFET and each MOSFET is turned ON at substantially zero drain voltage and reverse current through the switch.

30. The DC-DC converter of claim 28, wherein the turn OFF times of the first and second semiconductor switches determines the direction of power flow through the converter.

31. The DC-DC converter of claim 30, wherein turn OFF of each semiconductor switch is based on one or more circuit parameters of the one of the first and second switches connected with that switch.

32. The DC-DC converter of claim 31, wherein the one or more parameters are chosen from the group consisting of converter input voltage, converter output voltage, first winding voltage, second winding voltage, and current level in the switch.

33. In a DC-DC converter having a primary circuit connected to a primary winding of a transformer and a secondary circuit connected to a secondary winding of a transformer, an input connection to the primary circuit adapted to receive an input voltage and a load connection to the secondary circuit adapted to connect an output voltage to a load, a first signal-controlled semiconductor switching device in the primary circuit connected in current-controlling relation to the primary winding of the transformer, and a positive feedback path including a further winding of the transformer in the primary circuit, the feedback path connected to apply a control signal in controlling relationship to the first signal-controlled semiconductor switching device; the improvement comprising:

(a) a second signal-controlled semiconductor switching device in the secondary circuit connected in current switching relationship to the secondary winding of the transformer, (b) a control circuit connected in controlling relation to the second signal-controlled semiconductor switching device in the secondary circuit, the control circuit being connected to produce a control signal dependent on a relationship between the output voltage of the converter and a reference voltage, (c) a reference voltage source providing the reference voltage, and (d) the control circuit having an output voltage-dependent, voltage-supplying circuit connection to the load connection and a connection to the reference voltage source, whereby the control circuit effects energy transfer back to the primary circuit when output voltage rises so as to alter the duty cycle of the first signal-controlled semiconductor switching device to thereby regulate output voltage.

34. A method of DC-DC conversion comprising:
(a) providing a power transformer,
(b) providing first and second semiconductor switches in current conducting relation with first and second windings, respectively, on the power transformer,
(c) providing a first control circuit for turning ON and OFF the first semiconductor switch solely on the basis of operating parameters in the first circuit,
(d) providing a second control circuit for turning ON and OFF the second semiconductor switch solely on the basis of operating parameters in the second circuit,
(e) applying an input DC voltage to a first circuit coupled to the first pair of windings,
(f) with the first control circuit turning OFF the first semiconductor switch to induce a reverse current in the second winding and through the semiconductor switch in current conducting relation therewith,
(g) with the second control circuit turning ON the second semiconductor switch connected with the second winding when voltage across the second winding is substantially zero and while current in the second winding and second semiconductor switch is reverse current,
(h) with the second control circuit turning OFF the second semiconductor switch when current in the second winding and second semiconductor switch is forward current, and
(i) with the first control circuit turning ON the first semiconductor switch connected with the first winding when voltage across the first winding is substantially zero and while current in the first winding and the first semiconductor switch is reverse current.

35. The method of DC-DC conversion of claim 34, further comprising:
(j) providing the first control circuit and the second control circuit coupled in controlling relation to a control terminal on the first and second semiconductor switches, respectively,
(k) coupling first and second current sensors in current sensing relation with the first and second semiconductor switches, respectively, and
(l) inputting first and second current direction signals to the first and second control circuits from the first and second current sensors, respectively.

36. In a method of DC-DC conversion wherein an input voltage is applied via a first circuit to a first winding of a power transformer, a first semiconductor switch is turned ON to cause current conduction through the first winding and turned OFF to induce current conduction in a second winding, a second semiconductor switch is connected in a second circuit supplying an output voltage from the second winding to an output of the converter, the improvement comprising:
(a) detecting by current sensing means in the second circuit when there is a reverse current through the second semiconductor switch,
(b) turning ON the second semiconductor switch while current therethrough is in a range from zero current to a level of reverse current and when voltage across the second semiconductor switch is substantially zero, and
(c) turning OFF the second semiconductor switch after a period of forward current conduction therethrough and through the second winding.

37. The method of DC-DC converting according to claim 36, further comprising:
(d) sensing at least one operating parameter of the second circuit and turning OFF the second semiconductor switch in response thereto.

38. The method of DC-DC converting according to claim 37, wherein the operating parameter is chosen from the group consisting of voltage across the second winding, current in the second semiconductor switch, and a set time delay.

39. The method of DC-DC converting according to claim 37, further comprising:
(e) sensing at least one operating parameter of the second circuit and when the second semiconductor switch is conducting the current that is in the range from zero current to a level of reverse current switching ON the second semiconductor switch in response to the operating parameter sensed.

40. The method of DC-DC converting according to claim 39, wherein the operating parameter is chosen from the group consisting of voltage across the second winding, current in the second semiconductor switch and a set time delay.

41. The method of DC-DC converting according to claim 37, wherein the at least one operating parameter is voltage across the second winding and the step of sensing the at least one operating parameter comprises providing a reference voltage, comparing the voltage across the second winding to the reference voltage and applying a forward biasing central signal to a control terminal of the second semiconductor switch when the voltage across the second winding has a predetermined relationship to the reference voltage.

42. The method of DC-DC converting according to claim 37, further comprising:
(f) detecting when there is a reverse current through the first semiconductor switch,
(g) turning ON the first semiconductor switch while current therethrough is in a range from zero current to a level of reverse current, and when voltage across the first semiconductor switch is substantially zero.

43. In a method of DC-DC conversion wherein an input voltage is applied via a first circuit to a first winding of a power transformer, a first semiconductor switch is turned ON to cause current conduction through the first winding and turned OFF to induce current conduction in a second winding, a second semiconductor switch is connected in a second circuit supplying an output voltage from the second winding to an output of the converter, the improvement comprising:
(a) sensing in the second circuit a first voltage related to an output voltage of the converter,
(b) sensing in the second semiconductor a reverse current,
(c) comparing the first voltage to the reference voltage, and
(d) turning ON the second semiconductor switch when the first voltage bears a predetermined relationship to the reference voltage and when a reverse current is sensed in the second semiconductor switch.

* * * * *